(12) United States Patent
Genovese

(10) Patent No.: US 11,739,707 B2
(45) Date of Patent: Aug. 29, 2023

(54) CONTROL SYSTEM OF FUEL INJECTION FOR AN INTERNAL COMBUSTION ENGINE PROVIDED WITH A LINE OF FUEL RETURN

(71) Applicant: VITTORAZI MOTORS S.R.L., Montecosaro (IT)

(72) Inventor: Santino Genovese, Cinisello Balsamo (IT)

( * ) Notice: Subject to any disclaimer, the term of this patent is extended or adjusted under 35 U.S.C. 154(b) by 0 days.

(21) Appl. No.: 17/906,140

(22) PCT Filed: Mar. 12, 2021

(86) PCT No.: PCT/IB2021/052072
§ 371 (c)(1),
(2) Date: Sep. 12, 2022

(87) PCT Pub. No.: WO2021/186310
PCT Pub. Date: Sep. 23, 2021

(65) Prior Publication Data
US 2023/0106514 A1 Apr. 6, 2023

(30) Foreign Application Priority Data

Mar. 17, 2020 (IT) .................. 102020000005620

(51) Int. Cl.
*F02D 41/24* (2006.01)
*F02D 41/14* (2006.01)
*F02D 41/22* (2006.01)

(52) U.S. Cl.
CPC ..... *F02D 41/2467* (2013.01); *F02D 41/1401* (2013.01); *F02D 41/22* (2013.01);
(Continued)

(58) Field of Classification Search
CPC .. F02D 41/2467; F02D 41/1401; F02D 41/22; F02D 41/221; F02D 41/3836;
(Continued)

(56) References Cited

U.S. PATENT DOCUMENTS

| 4,967,712 | A | 11/1990 | Chasteen |
| 5,445,019 | A * | 8/1995 | Glidewell ............... F02M 65/00 123/387 |
| 6,273,069 | B1 * | 8/2001 | Nestvall ............... F02D 41/2467 73/114.49 |
| 10,513,998 | B1 | 12/2019 | Uhrich et al. |

(Continued)

FOREIGN PATENT DOCUMENTS

| DE | 19539885 A1 | 11/1996 |
| EP | 1091116 A2 | 4/2001 |
| WO | 2012080334 A1 | 6/2012 |

OTHER PUBLICATIONS

International Search Report for corresponding PCT/IB2021/052072 dated Jul. 1, 2021.

(Continued)

*Primary Examiner* — George C Jin
(74) *Attorney, Agent, or Firm* — Egbert, McDaniel & Swartz, PLLC

(57) ABSTRACT

Electronic fuel injection control system for an internal combustion engine, the internal combustion engine being equipped with at least one fuel feeding line provided with a fuel tank, at least one throttle valve, at least one injector, at least one fuel pump, at least one fuel return line having at least one solenoid valve, at least one first fuel return duct that connects the injector to the solenoid valve, at least one overpressure valve, at least one second return conduit adapted to connect the overpressure valve and the solenoid valve with the tank, wherein the fuel return line is provided with at least one calibrator allowing at least the state of said fuel pump and relative performances thereof to be verified.

7 Claims, 4 Drawing Sheets

(52) U.S. Cl.
CPC .............. *F02D 2041/1437* (2013.01); *F02D 2041/224* (2013.01); *F02D 2200/0404* (2013.01); *F02D 2200/0602* (2013.01)

(58) Field of Classification Search
CPC ....... F02D 2041/1437; F02D 2041/224; F02D 2041/1431; F02D 2041/2027; F02D 2041/228; F02D 2200/0404; F02D 2200/0602; F02D 2200/021; F02D 2200/0402; F02M 37/0023; F02M 37/0052
See application file for complete search history.

(56) References Cited

U.S. PATENT DOCUMENTS

| | | | | |
|---|---|---|---|---|
| 2009/0056676 A1* | 3/2009 | Nakata | ................ | F02D 41/221 123/480 |
| 2010/0036585 A1* | 2/2010 | Scharfenberg | ..... | F02M 37/0029 123/456 |
| 2020/0300189 A1* | 9/2020 | Pursifull | ............ | F02D 41/3845 |

OTHER PUBLICATIONS

Written Opinion of the International Searching Authority for corresponding PCT/IB2021/052072 dated Jul. 1, 2021.

Payri R et al, "Fuel temperature influence on the performance of a last generation common-rail diesel ballistic injector. Part II: 1D model development, validation and analysis", Energy Conversion and Management, Elsevier Science Publishers, Oxford, GB,vol. 114, Feb. 23, 2016 (Feb. 23, 2016), p. 376-391.

* cited by examiner

CONTROL SYSTEM OF FUEL INJECTION FOR AN INTERNAL COMBUSTION ENGINE PROVIDED WITH A LINE OF FUEL RETURN

The present invention relates to a fuel feeding system for an internal combustion engine.

More in detail, the present invention refers to an electronic fuel injection control system for an internal combustion engine.

Even more in detail, the present invention refers to an electronic fuel injection control system for a two-stroke engine with EFI (Electronic Fuel Injection) system.

As known, there are different types of fuel feeding systems, for example, for medium-low service pressures:
- feeding systems with a return line comprising a fuel pump, housed in the tank or outside, a feeding line connecting the pump to the injectors, a return line allowing the excess fuel to return to the tank through a pressure regulator;
- feeding systems without a return line and comprising fuel pressure controls of the mechanical type, via a pressure regulator integrated in the fuel pump, or of the electronic type, via an electronic pressure sensor and an ECU (Engine Control Unit) unit that keeps modulating the pump in order to obtain the desired constant pressure.

In both cases the pressure parameter is used to modulate the pump flow rate in feedback, in order to obtain always the same pressure value.

A problem common to both types listed above is related to the electrical consumption of the fuel pump due to the need to have the fuel line always at constant pressure at different engine revolution speeds and to the weight of the same components.

In recent years, solutions have been sought adapted to reduce such consumption while ensuring the correct operation of the engine, especially for all those applications requiring pumps with reduced weight and dimensions and low electrical consumption.

However, the different solutions proposed by the prior art do not allow a significant reduction in the fuel pump consumption.

As partly anticipated, such issue is strongly felt for those applications requiring reduced electrical consumption and low weights.

In fact, high electrical consumptions impose the use of storage batteries and/or alternators or similar larger devices, resulting in an overall increase in weight.

Such increase in weight is strongly limiting in sectors where the lightness of the engine and its components is a primary factor; considering, for example, the internal combustion engines used in aviation, ultralights, dynamic model building, (rotary-wing or fixed-wing) drones.

In such applications, the weight greatly affects the performance and manoeuvrability of the motorized paraglider or motorized hang-glider and the main need is to reduce the weights to the benefit of manageability and responsiveness of the vehicle.

In addition, another issue that afflicts the current feeding systems is related to the fuel pump wear that causes, over time, a change in the operating parameters and a variation in the performance of the same.

Such variations may affect the operation of the pump itself, for example by reducing its ability to deliver fuel at higher speeds, and consequently the engine performance by limiting it.

One of the main causes of pump wear, particularly in the feeding systems with return-line, is related to the heating of the fuel as it transits along the fuel feeding and return lines and therefore to an increase in fuel temperature in the tank (the fuel is taken from the tank, circulated in the feeding system and then reintroduced into the same tank).

Such heating results in overheating of the pump, which operates with hotter fuel, and a consequent increase or acceleration of its deterioration.

Such issue is particularly felt in the case of tanks with reduced capacity, such as those used, for example, in the field of motorized drones or paragliders, as the limited quantities of fuel contained therein are more subject to rapid and progressive heating.

The object of the present invention is to obviate such kind of drawbacks, by providing an electronic fuel injection control system for an internal combustion engine capable of greatly reducing the consumption of electrical current.

A further object of the present invention, at least for one or more embodiment variants, is to provide an electronic fuel injection control system for an internal combustion engine capable of reducing the weight of the electrical devices.

A further object of the present invention, at least for one or more embodiment variants, is to provide an electronic fuel injection control system for an internal combustion engine capable of controlling and detecting any variations in the performance and operation of the fuel pump.

This and other objects, which shall appear clearly hereinafter, are achieved with an electronic fuel injection control system and related devices according to claim 1.

Other objects may also be achieved by means of the additional features of the dependent claims.

Further features of the present invention shall be better highlighted by the following description of a preferred embodiment, in accordance with the patent claims and illustrated, purely by way of a non-limiting example, in the annexed drawing tables, wherein:

Figure 1:
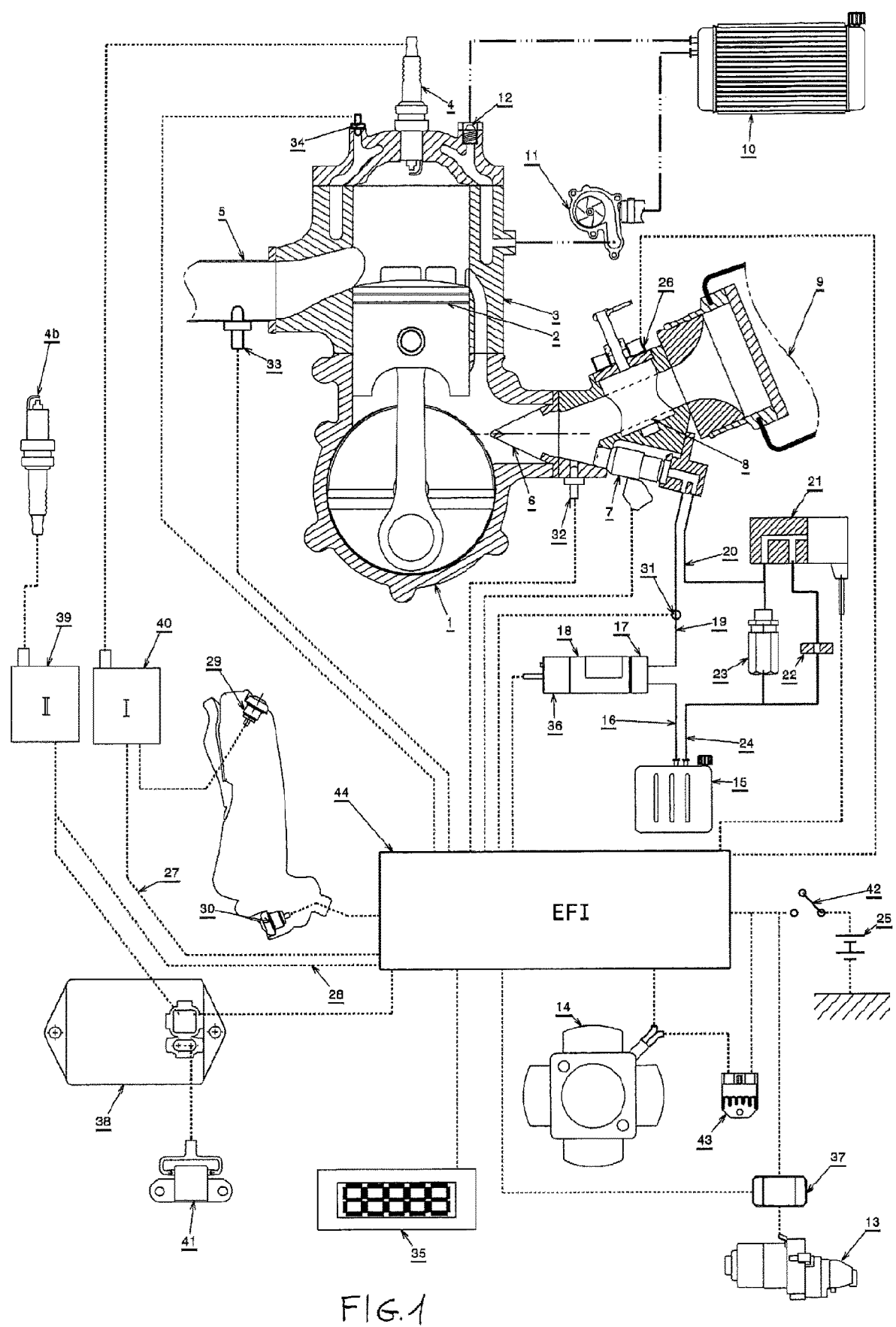
FIG. 1 shows a system diagram of a generic two-stroke internal combustion engine equipped with a possible embodiment of the feeding system according to the present invention.

The features of the electronic fuel injection control system according to the present invention are now described using the references contained in the figures.

It is also noted that any dimensional and spatial term (such as "lower", "upper", "inner", "outer", "front", "rear", "vertical", "horizontal" and the like) possibly used below refers, unless otherwise indicated, to the position according to which the object of the invention shown in the drawings is arranged in operating conditions. Below, reference will be made to an internal combustion engine equipped with the essential components for its operation, neglecting all those components and/or accessories (sensors, exhaust means, filters, etc.) that may be installed on an engine and of which a detailed list shall not be provided as they are known to the man skilled in the art and are not the object of the present description.

The parameters and the respective references used hereinafter in the description are listed below:

Qmin.nom: fuel nominal minimum flow rate value at engine minimum operating speed, a detail preferably provided by the engine manufacturer and generally referred to operation in standard atmosphere conditions (1015 hpa, 15° C.);

Qmin fuel minimum operating flow rate value at engine minimum operating speed, corresponds to Qmin.nom reduced by a percentage variable between 5÷90%, preferably between 15÷80%. This reduction in fuel flow rate allows the feeding system a greater possibility of fuel quantity regulation at engine minimum operating speed (for example Qmin=Qmin.nom−Qmin.nom*0.7);

Qmax.nom: fuel nominal maximum flow rate value at maximum operating speed, a detail preferably provided by the engine manufacturer and generally referred to operation in standard atmosphere conditions (1015 hpa, 15° C.);

Qmax: fuel maximum operating flow rate value at engine maximum operating speed, corresponds to Qmax.nom increased by a percentage variable between 5÷30%, preferably between 15÷25%. Such increase in fuel flow rate allows the feeding system a greater possibility of fuel quantity regulation at engine maximum operating speed (for example Qmax=Qmax.nom+Qmax.nom*0.2);

$t_{ai}$: injector mechanical opening time, i.e. the time necessary for the injector to move from the closed to the open position; characteristic of the injector itself (data provided by the injector manufacturer), for example it can be 1 ms;

$t_{r.min}$: injector energisation time at minimum speed, may correspond to the time taken by the injector to open ($t_{ai}$) increased by a time Δt preferably defined by the designer of the EFI system according to the minimum engine revolutions and the minimum amount of fuel to be injected; $t_{r.min}=t_{ai}+\Delta t$, for example Δt=0.1÷0.7 ms;

$t_{ci}$: injector mechanical closing time, i.e. the time necessary for the injector to move from open to closed position; characteristic of the injector itself (data provided by the injector manufacturer), for example it can be 1 ms;

$t_{r.max}$: injector energisation time at maximum speed, may correspond to the time taken by the engine to perform one revolution, decreased by the mechanical closing time. For example: $t_{r.max}=1/(\max RPM/60)-t_{ci}$;

$t_n$: intermediate energisation times between $t_{r.min} \div t_{r.max}$;

Pmin pressure value of the fuel line necessary to ensure the flow rate Qmin with a pulsating injector at a frequency equal to the minimum engine speed with minimum energisation time $t_{r.min}$;

Pmax: pressure value of the fuel line necessary to ensure the flow rate Qmax with a pulsating injector at a frequency equal to the maximum engine speed with maximum energisation time $t_{r.max}$;

Ptest: pressure value of the fuel line used as a reference during the pump test to simulate Pmin with return line closed and engine off;

Rpm.Pompa.min: fuel pump revolutions per minute necessary to obtain the pressure Pmin and ensure the flow rate Qmin with a pulsating injector at a frequency equal to the minimum engine speed, and an energisation time equal to $t_{r.min}$; a signal PWM.Pompa.min corresponds to such rotation speed;

Rpm.Pompa.max: fuel pump revolutions per minute necessary to obtain the pressure Pmax and guarantee the flow rate Qmax with an injector made pulsating at a frequency equal to the maximum engine speed, and an energisation time equal to $t_{r.max}$; a signal PWM.Pompa.max corresponds to such rotation speed;

Rpm.Pompa.n: intermediate values of the number of revolutions of the fuel pump included in the range Rpm.Pompa.min÷Rpm.Pompa.max.

Energisation time of the injector means the time during which the injector is electrically powered to implement its opening.

The flow rate values Qmin and Qmax are determined by means of the fuel flow rate values Qmin.nom and Qmax.nom, said values Qmin and Qmax being respectively the lower and upper operating limit of the engine where Qmin<Qmin.nom<Qmax.nom<Qmax.

The Qmin and Qmax values therefore define the fuel flow rate range within which the electronic injection control system according to the present invention operates in order to regulate the fuel flow rate to be delivered according to at least the opening degree of the throttle valve.

The electronic fuel injection control system for internal combustion engines according to the present invention may advantageously be used and installed on any type of internal combustion engine, in particular on any 2-stroke internal combustion engine (in jargon 2S) equipped with one or more fuel injectors and at least one processing and control unit of the fuel feeding system.

Hereinafter, by way of non-limiting example, a generic 2S engine equipped with different systems and sensor means and a generic control unit will be briefly described; nothing prevents from applying, through appropriate arrangements, what is illustrated here to other types of internal combustion engines or to other types of processing and control units.

FIG. 1 shows a generic 2S engine advantageously equipped with one or more sensors.

Said 2S engine may comprise an engine body 1, at least one piston 2, at least one cylinder 3, at least one spark plug ignition means 4, at least one exhaust muffler 5, at least one reed valve 6, at least one fuel feeding line.

Said fuel feeding line is advantageously provided with a fuel tank 15, at least one throttle valve 8, at least one injector 7, at least one fuel pump equipped with a pump body 17 and actuation means 18 (substantially an electric motor with or without brushes), at least one first feeding duct 16 connecting said tank 15 to said fuel pump 17, at least one second feeding duct 19 adapted to connect said fuel pump 17 with said injector 7.

In general, "throttle valve" means a device, generally placed in the feeding line, capable of regulating the air flow to be introduced into the carburettor or, in injection engines, directly into the combustion chamber, for four-stroke engines, or in the crank chamber for two-stroke engines, its opening degree being closely related to the position of the accelerator.

The fuel feeding line, depending on the type of engine and/or the type of application, may be provided with at least one fuel return line comprising at least one overpressure or safety valve 23.

The fuel feeding methods according to the prior art provide for many advantageous variants and the main ones are listed below.

According to a preferred embodiment variant, the fuel pump 17 may be of the PWM (Pulse-Width Modulation) type, i.e., it can provide for a digital modulation that allows obtaining a variable average voltage as a function of the ratio between the duration of the positive and negative pulse (duty cycle), and is provided with a pump driver 36 adapted to transform a PWM or analog signal into a drive of the same pump, defining the rotation direction, acceleration and number of revolutions of the engine that drives the pump.

The engine may advantageously be equipped with at least one processing and control unit 44, for example of the EFI (Electronic Fuel Injection) type.

The engine may be provided with an air box 9, a primary ignition system 27, starting means 13 preferably comprising relay means 37, an alternator 14, a storage battery 25, a voltage rectifier 43 and battery charger, and a cooling system comprising a radiator 10, a cooling liquid circulation pump 11, a thermostat 12 (preferably of the mechanical type).

Said primary ignition system 27 may advantageously comprise a high voltage coil 40, a mechanical switch 42, preferably of the type with integrated fuse, for the power supply of the processing and control unit 44, a start button 30, and a shut-off button 29.

Said engine may be provided with a secondary ignition system 28 comprising an electronic control unit 38, preferably of the CDI (Capacitor Discharge Ignition) type, a second high voltage coil 39 suitably connected to at least a second optional spark plug 4.*b*, a magnetic pick-up for CDI 41.

Said engine may advantageously be equipped with a plurality of sensor means, each adapted to detect a specific operating parameter or a specific physical quantity, suitably communicating with said processing and control unit 44.

For example, the engine may comprise one or more of the following sensors: at least one detection sensor 26 for the opening degree or the position of the throttle valve 8, at least one sensor for the number of revolutions connected to said coil 40, at least one sensor for the number of revolutions connected to said coil 39, at least one pressure sensor 31 adapted to detect the fuel pressure along the second feeding duct 19, at least one MAP (Manifold Absolute Pressure) sensor 32, at least one temperature sensor 33 for detecting the Exhaust Gas Temperature (EGT), at least one temperature sensor 34 for detecting the CHT (Cylinder Head Temperature) spark-plug under-head or coolant temperature.

Furthermore, the engine may comprise a user interface, advantageously provided with a display 35, suitably positioned so that the user can view different engine parameters and/or statistical data, and/or set predefined mappings, adjust the carburetion values (stoichiometric ratio) and/or change various system settings.

Figure 2:
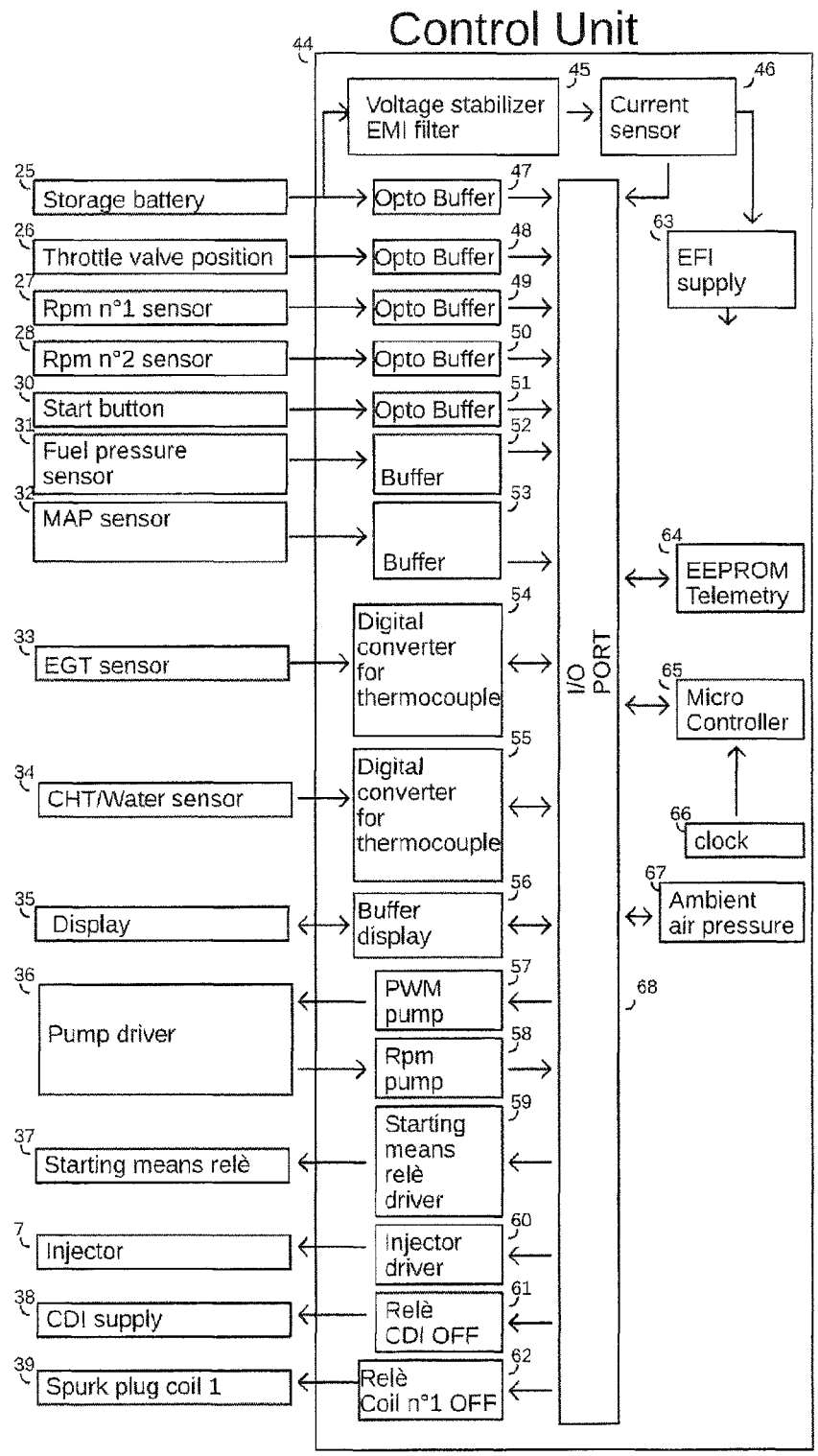
FIG. 2 shows a system diagram of the processing and control unit depicted in FIG. 1.

FIG. 2 illustrates in detail the electronic processing and control unit 44, hereinafter referred to as control unit 44 for clarity of description.

Said control unit 44 may advantageously comprise an EMI (Electro Magnetic Interference) filtering and voltage stabilizer unit 45, a current sensor 46, preferably of the digital type, supply voltage detection means 47 for the storage battery 25, such as for example an analog photocoupler, detection means 48 of the opening degree or the position of the throttle valve 8, such as for example a digital photocoupler cooperating with the detection sensor 26 of the throttle valve 8, detection means 49 for reading the sensor for the number of revolutions, connected to the coil 40 of the primary ignition system 27 (for example a digital photocoupler), detection means 50 for reading the sensor of the number of revolutions, connected to the coil 39 of the secondary ignition system 28 (for example a digital photocoupler).

The control unit 44 may further comprise a photocoupler 51 for controlling the start button 30, a buffer 52, preferably having the function of voltage leveller and shifter, for the fuel pressure sensor 31, a buffer 53, preferably with voltage leveller and shifter function, for the MAP sensor 32, an EGT temperature analog/digital converter 54 with diagnostics for the detection of interrupted probe and of the cold junction temperature (ambient temperature), a CHT or coolant temperature analog/digital converter 55 with interrupted probe diagnostics and cold junction temperature (ambient temperature), a buffer 56 for transmitting/receiving data to the display 35.

Again said control unit 44 may advantageously be provided with a PWM 57 and Rpm 58 interface for driving the fuel pump 17, an interface for reading the number of revolutions of said pump 17, a relay driver 59 cooperating with relay means 37, a driver 60 for driving the injector 7, a relay means 61 for feeding the secondary ignition system 28, a relay means 62 for switching off the coil 40.

Furthermore, the control unit 44 is preferably provided with feeding means 63, memory means 64 for at least the trip/telemetry data, with at least one ambient pressure sensor 67, Input/Output devices or ports 68, at least one microcontroller 65 with PWM, ADC (Analog to Digital Converter) functions and equipped with communication means and systems (for example of the SPI/I2C/USART, DAC type or the like), integrated memory means (RAM/ROM/EE-PROM), clock 66.

What has been illustrated so far is part of the heritage of the prior art.

The electronic fuel injection control system for internal combustion engine according to the present invention, hereinafter referred to as the feeding system for convenience of description, may comprise a processing and control unit (ECU) 44 provided with at least one microcontroller 65, memory means 64 and at least one processing and/or control software, and is characterised in that it provides for simultaneously modulating both the number of revolutions of the fuel pump, in order to vary the pressure of the fuel feeding line, and the injector energisation time.

Basically, the feeding system regulates the number of revolutions of the fuel pump, tending to deliver the fuel with a lower pressure than that generally provided for that fuel flow rate, and at the same time controls and regulates the injector or injectors energisation time in order to compensate, at least at medium-low speeds, for the lower fuel pressure with a longer energisation time so as to cause the correct quantity of fuel to arrive into the combustion chamber.

The object is to obtain an accurate and precise fuel delivery regulation and at the same time to allow keeping low the energy consumption of the feeding system.

Such simultaneous double regulation is performed and implemented by the feeding system through one or more mappings (also referred to as "configuration tables") appropriately determined and defined by the Applicant during laboratory experimental tests or software simulations or the like.

In accordance with a possible embodiment variant, the feeding system can provide for and operate with at least the following mappings:

"fuel throttle-flow rate valve opening mapping", allows a specific opening degree $\theta_{valv}$ of the throttle valve 8 to be correlated to a certain fuel flow rate value Qn;

"Injector mapping": allows determining a specific energisation time $t_n$ of the injector 7 for a specific fuel flow rate Qn;

"pump mapping": allows a specific flow rate value Qn to be correlated with a specific value of the number of revolutions of the fuel pump.

In general, the feeding system, having detected the opening degree or the position of the throttle valve 8, determines a specific fuel flow rate Qn and through it identifies a specific energisation time $t_n$ of the injector 7 related to a precise rotation value Rpm.Pompa.n of the pump 17.

Having established the rotation value of the fuel pump 17, the control unit 44 consequently drives the injector 7 and the engine 18 of said pump 17, for example by calculating and modifying the duty-cycle of the pump itself.

Such mappings provide for multiple possible adjustments that combine the number of revolutions of the fuel pump 17 and the energisation time of the injector 7 according to the opening degree of the throttle valve 8.

The feeding system according to the present invention is hereinafter described applied to a 2S engine installed on a paraglider or a hang glider; nothing prevents what illustrated above from being extended to similar sectors such as aviation, ultralights, dynamic model building, drones or other different applications such as nautical or terrestrial ones.

Said mappings may be identified and characterised using a suitably equipped test bench according to the following possible steps:

a) once the maximum Qmax.nom and minimum Qmin.nom flow-rate nominal values at the maximum and minimum engine revolution speed (parameters generally supplied by constructor of the internal combustion engine) are known, proceed by calculating flow-rate operational values Qmin and Qmax according to what described above; such expansion of the minimum Qmin.nom and maximum Qmax.nom fuel flow-rate Q, allows extending the scope of use of the engine making it adaptable to different load (for example, different types of propellers or wings), or chemical (different types of fuel), or environmental conditions (a paramotor engine can see temperature and air pressure values vary significantly and sometimes suddenly, depending on the flying altitude). The percentage with which Qmin.nom and Qmax.nom are reduced and increased, respectively, takes into account such conditions and/or the type of use for which the engine itself is intended;

b) once the Qmin is established, proceeding by determining the pressure value Pmin at which the pump 17 must operate to deliver said flow rate Qmin. Then proceeding by activating the injector 7 with pulses equivalent to the minimum engine rotation speed and with an energisation time at minimum equal to $t_{r.min}$ until empirically finding the pressure value Pmin capable of providing the fuel flow rate Qmin in the energisation time at minimum $t_{r.min}$ of the injector 7. Once the pressure Pmin has been determined, the number of revolutions Rpm.Pompa.min of the fuel pump 17 and the relative signal PWM.Pompa.min are stored. Proceeding by suspending the electrical power supply to injector 7 and measuring the pressure value Ptest;

c) the pressure value Pmax at which the pump 17 must operate to deliver said flow rate Qmax is then determined. Proceeding by activating the injector 7 with pulses equivalent to the maximum engine rotation speed and with an energisation time at maximum equal to $t_{r.max}$ until empirically finding the pressure value Pmax capable of providing the fuel flow rate Qmax in the energisation time at maximum $t_{r.max}$ of the injector 7. Once the pressure Pmax has been determined, the number of revolutions Rpm.Pompa.max of the fuel pump 17 and the relative signal PWM.Pompa.max are stored.

In this way, the limit operating conditions of the pump 17, i.e. pressure and number of revolutions, are determined, in relation to the respective limit flow rates Qmin and Qmax.

It is possible to speed up the laboratory tests by determining, through software simulations or the like, what the values of Pmin and Pmax needed to deliver Qmin and Qmax could be.

Knowing the operating extremes of the fuel pump 17, proceeding, through dedicated software and/or mathematical simulations and/or experimental tests, by defining one or more fuel flow rate curves within the range Qmin÷Qmax related to the engine revolution speed and/or to the opening degree of the throttle valve 8 and/or to the energisation time $t_n$ of said injector 7 and/or to the rotation speed of the fuel pump 17, respectively.

At least one or more of said curves may be discretised into "$n_{th}$" parts so as to obtain:

a "pump mapping", where each of the $n_{th}$ parts represents a certain fuel flow rate value Qn to which a specific rotation value of the signal PWM.Pompa.n and therefore of pump rotation Rpm.Pompa.n 17 corresponds;

an "injector mapping", where each one of the $n_{th}$ parts represents a certain fuel flow rate value Qn that corresponds to a specific energisation time $t_n$ of the injector 7 related to a precise rotation value Rpm.Pompa.n of the pump 17;

a "fuel throttle flow rate valve opening mapping", where each of the $n_{th}$ parts represents a certain opening degree $\theta_{valv}$ of the throttle valve 8a to which a specific fuel flow rate Qn corresponds.

The pump mapping, therefore, is obtained by a subdivision of the operating range between Rpm.Pompa.min and Rpm.Pompa.max in said "$n_{th}$" parts, where each one of the "$n_{th}$" parts represents a certain flow rate value Qn to which a specific number of revolutions Rpm.Pompa.n of the pump 17 corresponds.

Similarly, the injector mapping is obtained by dividing the operating range between $t_{r.min}$ and $t_{r.max}$ into said "$n_{th}$" parts, where each of the "$n_{th}$" parts represents a certain flow rate value Qn to which a specific energisation time $t_n$ of the injector 7 corresponds.

In accordance with a possible embodiment variant, each of said one or more curves may be divided, for example, into 100÷350 parts, preferably into 150÷250 parts. The choice of the number of subdivisions may be made on the basis of the regulation accuracy to be obtained, the greater the number of subdivisions, the greater the possible adjustments and therefore the greater the accuracy, or based on the components installed, which must be able to implement the regulations provided for by the same subdivision, either on the basis of the type of application or on the basis of the type of engine used.

Similarly, it is possible to provide for a subdivision of the operating range of the throttle valve 8, by attributing, for example, a zero value to the fully closed position of the throttle, and a value of one hundred to the maximum opening position, then dividing said operating interval into one hundred parts.

Nothing prevents from dividing such operating range in a different way, for example by evaluating a $n_{th}$ discretisation number different from one hundred or by considering the rotation angle of the throttle valve 8.

Said operating range, by means of dedicated software and/or mathematical simulations and/or experimental tests, may be advantageously correlated to the fuel flow rate Qn to be delivered to meet the engine requirements, thus defining a "fuel throttle valve opening flow rate mapping".

Said mappings and/or configuration tables are suitably stored to the integrated memory means of the control unit 44.

Figure 3:
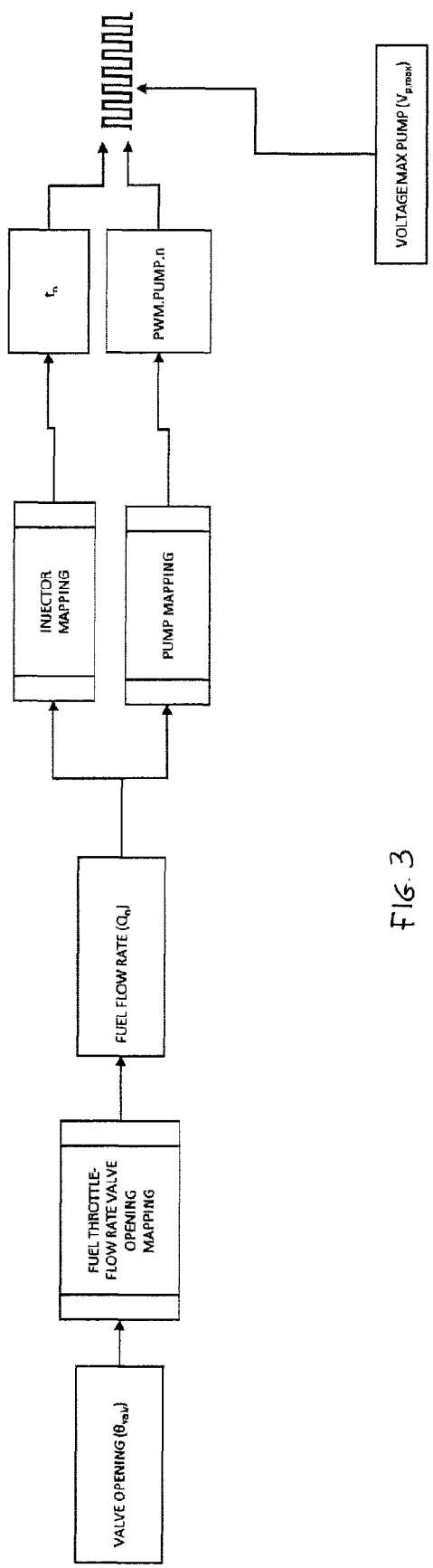
FIG. 3 shows a block diagram of the operation of a first possible embodiment variant of the electronic fuel injection control system for an internal combustion engine according to the present invention.

In accordance with a first possible variant of the feeding system according to the present invention, shown in FIG. 3, said feeding system may be equipped only with the sensor means essential to its operation, such as the detection sensor 26 and possibly the fuel pressure sensor 31.

Such first possible variant provides that during the operation of the engine, the control unit 44, having received the opening value of the throttle valve 8 detected by the detection sensor 26, identifies the fuel flow rate value Qn necessary for the engine, by means of the fuel throttle valve opening-flow rate mapping, and determines the corresponding values of the energisation time $t_n$ of the injector 7, through the injector mapping, and the number of revolutions Rpm.Pompa.n of the fuel pump 17, by the pump mapping.

Basically, the method for determining the amount of fuel to be injected may provide for at least the following possible steps:
  receiving and processing, by said control unit 44, the opening value $\theta_{valv}$ of said throttle valve (8);
  identification, through said fuel throttle-flow rate valve opening mapping, of the fuel flow rate value Qn necessary to the engine at that instant;
  determination, with respect to said fuel flow rate value Qn, of the corresponding values of energisation time $t_n$ of said injector 7 and of the number of rotation revolutions Rpm.Pompa.n of said fuel pump 17.

Figure 4:
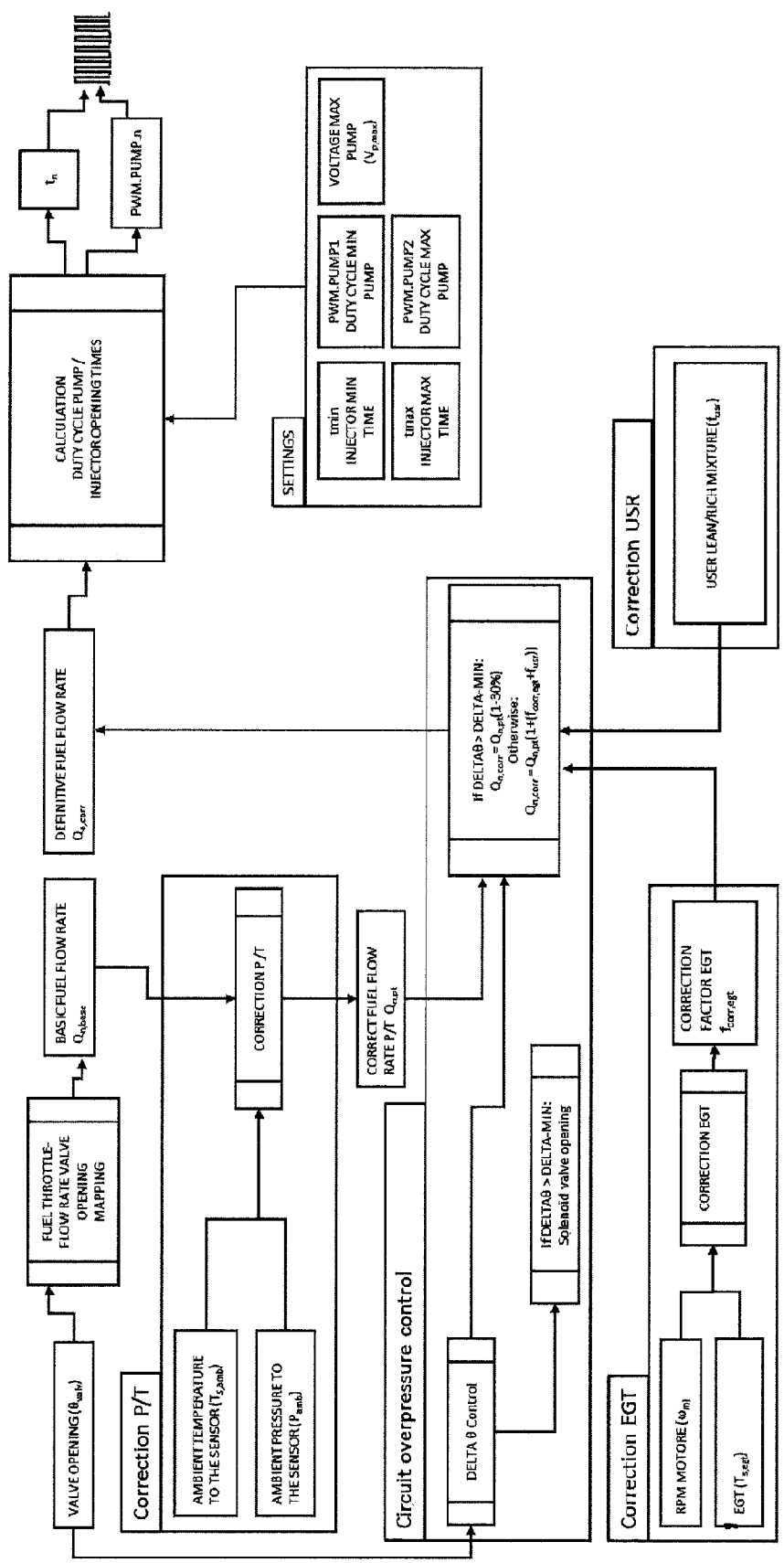
FIG. 4 shows a block diagram of the operation of a second possible embodiment variant of the electronic fuel injection control system for an internal combustion engine according to the present invention, provided with one or more sensor means.

In accordance with a second possible variant of the feeding system according to the present invention, shown in FIG. 4, said feeding system may be equipped with more complete and accurate sensors, such as the sensors described above.

In such case, while identifying the value of Qn, correction factors may be provided to modify and improve the flow rate Qn defined by said mappings for that specific opening degree of said throttle valve 8.

Said correction factors may take into account the parameters or quantities measured by the sensors provided for and installed, such as for example said EGT temperature 33, CHT temperature 34, and/or ambient air pressure 67 sensor means.

For example, while identifying the value of Qn, the control unit 44 may take into account the ambient air temperature, determined by means of dedicated temperature sensors or defined by said analog/digital converter 54 or 55, and/or the pressure of the ambient air, detected by the pressure sensor 67, and/or of the stoichiometric ratio set by the manufacturer or by the user by correcting the defined value Qn, by said mappings, for that specific opening degree of the throttle valve 8.

In such case it is possible to provide, on the basis of ambient pressure and temperature value, for a P/T correction of the value of Qn, by leaning or enriching the mixture according to the ambient conditions.

The purpose of such corrections is to identify the flow rate value Qn most suitable for the environmental (temperature and ambient air pressure) and/or operating conditions at which the engine is working so as to ensure an optimal fuel feed.

For example, the control unit 44 may take into account the EGT exhaust temperature, detected by the temperature sensor 33, and possibly the CHT sub-spark plug temperature, detected by the temperature sensor 34.

If the exhaust and/or sub-spark plug temperature, both correlated to the ambient temperature, is inconsistent with one or more threshold values, set by the manufacturer or by the user, the control unit 44 may correct the flow rate value Qn, for example by an appropriate algorithm.

FIG. 4 illustrates a possible variant of said feeding system provided with the correction factor that takes into account the exhaust temperature EGT and stoichiometric ratio control (USR correction; $f_{usr}$).

The USR correction is preferably a parameter that can express in percentage terms the user's preference to have the engine work with a richer or leaner mixture.

With reference to the fuel flow rate to be delivered at engine idle speed, it should be noted that it can be substantially equal to Qmin.nom at sea level and may vary between Qmin.nom and Qmin based on the flight altitude and ambient air pressure and temperature at which the engine is operating.

The percentage with which Qmin.nom is reduced to establish Qmin, in addition to the load or chemical conditions, is strongly influenced by the maximum flight altitude at which the engine will operate; the greater the flight altitude, the greater the reduction percentage and therefore the lower the Qmin value.

During engine operation, the fuel flow rate at idle speed is substantially equal to Qmin.nom at sea level and tends to Qmin as the altitude increases.

Similarly, even the maximum fuel flow rate that can be delivered at maximum engine speed may be substantially equal to Qmax at sea level, and tends to decrease, moving away from Qmax, as the altitude is increased, because the air density decreases as the altitude increases and therefore there is the need to lean the mixture.

It is the control unit 44, on the basis of the values detected and reported by the sensor means, that identifies from time to time the fuel flow rate Qn to be delivered, said fuel flow rate Qn being selected and determined by said control unit 44 in the defined interval between Qmin and Qmax where Qmin<Qmin.nom<Qmax.nom<Qmax.

Basically, considering that:
  each position or opening degree of the throttle valve 8 corresponds to a specific fuel flow rate Qn ("throttle valve opening-fuel flow" mapping);
  at each $n_{th}$ flow rate value Qn the energization time $t_n$ of the injector 7 (injector mapping) and the number of revolutions Rmp.Pompa.n of the pump (pump mapping) is determined;
the feeding system according to the present invention determines the amount of fuel to be delivered according to the following possible steps:
  detects the opening degree or the position of the throttle valve 8;
  it identifies, through the "throttle valve opening-fuel flow rate" mapping, a first fuel flow rate value Qn;
  such first value Qn may be corrected at least on the basis of the value of the stoichiometric ratio set and/or of the ambient temperature and/or pressure (correlated and indicative of the flight altitude), of the EGT or CHT parameters, if the respective detection sensor means are provided;

once said first flow rate value Qn or any correct flow rate value Qn is determined, the injector energisation time $t_n$ and the number of revolutions RPM.Pompa.n of the pump 17 are established (i.e. the pressure with which the fuel is delivered).

The feeding system, therefore, provides for modulating at the same time both the number of revolutions of the fuel pump and the energisation time of the injector according to the quantity of fuel Qn to be delivered for that predetermined opening degree or position of the valve 8.

Therefore, the feeding system, taking into account different operating and/or environmental parameters, allows obtaining an optimal fuel injection by defining and controlling injection times and pressures, instant by instant.

As anticipated, the feeding system according to the present invention may be advantageously provided with at least one fuel return line.

Said return line may advantageously comprise at least one solenoid valve 21, at least one fuel return duct 20 that connects said injector 7 to said solenoid valve 21, at least one overpressure or safety valve 23, at least one second return duct 24 adapted to connect said overpressure valve 23 and said solenoid valve 21 with said tank 15.

The solenoid valve 21, during the filling step of the fuel feeding circuit, is opened to allow the fuel and any air present to return into the tank so as to quickly and easily carry out the filling of the said circuit.

One of the purposes of such return line is to better manage sudden acceleration/deceleration changes.

For example, assuming the engine at idle speed, the feeding system, according to what illustrated, will inject a quantity of fuel substantially corresponding to Qmin.nom if at sea level or between Qmin and Qmin.nom if flying, depending on the air density.

If in this condition the throttle valve 8 were totally and instantaneously opened (for example in case of strong acceleration), the feeding system would respond, in accordance with said mapping and any correction factors, by delivering the maximum fuel flow rate provided for those load and flight conditions and thus intervening on the injector 7 and on the pump 17 adapting their operating conditions (energisation time; Rpm.Pompa) to the required acceleration.

In this way, due to the transition time required for the engine to go from idle to maximum speed (transient of the order of one second), the fuel delivery line pressure will increase well beyond the Pmax value expected at maximum revolution speed.

In fact, the fuel pump 17 almost instantly reaches the expected speed (Rpm.Pompa) just as the injector 7 opens immediately at the expected time, the respective operating conditions being determined by the control unit 44 according to the flight and acceleration conditions required.

However, the opening/energisation frequency of the injector 7 is related to the engine speed and the injector itself is initially not capable of managing the fuel flow rate provided for that position of the throttle valve and this leads to pressure rise.

Similarly, even in the step of strong deceleration there can be an accumulation of fuel which can excessively enrich the air-fuel mixture, with respect to the stoichiometric ratio, and cause an undesired shutdown of the engine.

This is due to the fact that the feeding system detects instant by instant the opening degree of the throttle valve 8 and adjusts the amount of fuel delivered accordingly; the feeding system, therefore, operates with an infinitesimal delay and the adjustment made is related to the opening degree of the throttle valve detected in the previous instant.

In case of strong deceleration, such delay may cause an accumulation of fuel along the feeding line and consequent enrichment of the mixture.

The fuel return line, therefore, is capable of draining excess fuel in the event of:

strong acceleration through the overpressure valve 23 so as to prevent the fuel circuit from reaching pressure values capable of damaging its components, said overpressure valve 23 intervening autonomously when certain pressure values are reached;

strong deceleration by the Delta θ control and any adjustment of the opening of the solenoid valve 21, in particular by opening said solenoid valve 21 and allowing the pressure of the fuel feeding line to decrease avoiding accumulations of fuel and consequent possible engine shutdown.

According to a preferred variant, illustrated in FIG. 4, the pressure control can be carried out through the Delta θ parameter, which represents the speed by which the throttle valve 8 is closed, and the comparison with a Delta-Minimum reference value set by the manufacturer or by the user.

If Delta θ is greater than Delta-Minimum, or if the throttle valve 8 is closed with a higher speed than that provided by Delta-Minimum, the control unit 44 may intervene by:

opening, partially or integrally, the solenoid valve 21, so as to avoid any pressure increases; and/or correcting and reducing, by means of an appropriate correction factor ($f_{corr,egt}$), the determined flow rate value Qn so as to lean the air-fuel mixture and avoid the possible shutdown of the engine. For example, the flow rate Qn may be corrected according to the formula $Q_{n,corr}=Q_n*(1-30\%)$ or according to the formula $Q_{n,corr}=Q_n*(1+(f_{corr,egt}+f_{usr}))$ where $f_{corr,egt}$ is said correction factor.

Instead, if Delta θ is lesser than Delta-Minimum, or if the throttle valve 8 is closed with a lesser speed than that provided by Delta-Minimum, the control unit 44 may intervene.

In accordance with a third possible embodiment variant of the feeding system according to the present invention, said feeding system provides that the fuel return line is further provided with at least one calibration means 22.

Said feeding system, therefore, is able to implement a method for checking the performance and status of the fuel pump by the use of at least one calibration means 22 and performing a check test illustrated below.

Said calibration means 22 may be sized and designed so as to simulate a specific fuel consumption of the engine and allow checking at least the state of said fuel pump (17; 18) and relative performances thereof; for this purpose it can comprise suitably shaped section narrowings or shrinkages, holes or the like.

In accordance with a possible embodiment variant, said calibration means 22 may be preferably placed downstream of the solenoid valve 21 and preferably defined by at least one calibrated hole 22.

In accordance with a preferred variant, said calibrated hole 22 has geometries capable of simulating, with the solenoid valve 21 substantially fully open, the consumption of the engine at maximum speed, i.e. the maximum operating fuel flow rate Qmax, required by the engine at maximum speed, to which the relative pressure Pmax of the fuel pump 17 corresponds.

It is preferable to simulate Qmax as greater measurement errors are encountered at high speeds and therefore it is advantageous to test the performance of the pump in such conditions.

Furthermore, if the calibrated hole 22 were to simulate Qmin, it would introduce a considerable section narrowing on the return line, limiting the fuel flow and thus compromising its functionality.

In such case, two calibrated holes should be provided, one adapted to simulate Qmax and the other Qmin, making the return line and the same feeding system more complex.

Said calibrated hole 22, simulating Qmax, allows check tests on the state of the fuel pump and its relative performances to be carried out and eventually proceeding with calibrations or modifications to the operating parameters of the same.

Said check test is extremely useful in the case of pumps with brush engines being capable, during their operating life, of varying their throughput due to the physical wear of the brushes and sometimes to the oxidation of the same rotor.

The feeding system, by the use of said calibrated hole 22, may perform a control check test adapted to identify and define the values of the number of revolutions of the pump 17 necessary to obtain the minimum Pmin and maximum Pmax pressure values, respectively, i.e. the pressure values capable of delivering the limit operating flow rates Qmin and Qmax and thus satisfy the limit operating conditions of the engine.

In the case of engines applied to paragliders or the like, said check test is useful for detecting any malfunctions and keeping the performance of the same engines constant and substantially unchanged, helping to ensure the safety of the user.

The check test may be programmed at any engine start or at predetermined time periods (for example every three months) or after a certain number of engine operating hours (for example every hundred work hours) or, alternatively, on user request as needed by the user interface.

Figure 5:
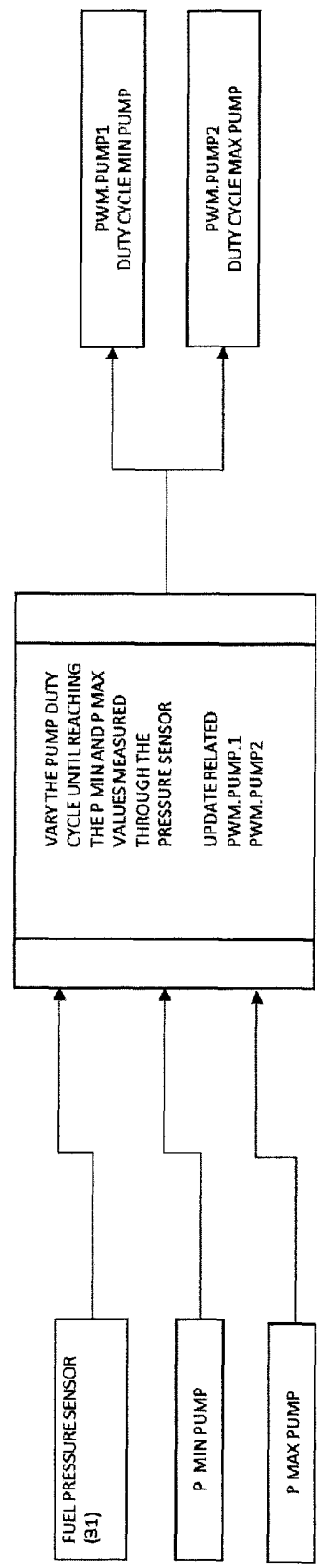
FIG. 5 shows a block diagram of the operation of a third possible embodiment variant of the electronic fuel injection control system for an internal combustion engine according to the present invention provided with a calibration means and capable of performing a check test of the fuel pump.

In accordance with a possible embodiment variant, reported by way of a non-limiting example and schematised in FIG. 5, the check test may include at least the following possible steps:
- close and keep the injector 7 closed;
- open the solenoid valve 21 and bleed the fuel feeding line by making the pump 17 work with a number of revolutions Rpm.Pompa.n, preferably Rpm.Pompa.n= ((Rpm.Pompa.max−Rpm.Pompa.min)/2);
- at the end of the bleeding, proceed, keeping the solenoid valve 21 open, with a gradual increase in the number of revolutions of the pump 17 until reaching, thanks to the calibrated hole 22, and detecting, by the pressure sensor 31, the fuel pressure value Pmax set for that engine;
- store the value of the signal PWM.Pompa.max corresponding to the rotation speed of the pump 17 capable of reaching Pmax;
- proceed by closing the solenoid valve 21 and reducing the number of revolutions of the pump 17 until detecting, by the pressure sensor 31, the fuel pressure value Ptest established for that engine;
- store the signal value PWM.Pompa.min corresponding to the rotation speed of the pump 17 capable of reaching Ptest and ensuring, in engine running conditions, the delivery of Qmin at Pmin pressure;
- the two signal values PWM.Pompa.min and PWM.Pompa.max of the pump are used by the control unit 44 to update at least said pump mapping.

Having found and defined the values of the signals PWM.Pompa.min and PWM.Pompa.max, the control unit 44 updates at least the pump mapping by dividing the range between PWM.Pompa.min and PWM.Pompa.max (or between Rpm.Pompa.min and Rpm.Pompa.max) into the $n_{th}$ divisions provided for by the feeding system and by correlating such values to the fuel flow Q.

Any variations in the density or viscosity of the fuel, that can alter the effectiveness of said check test, due to different ambient conditions (temperature and pressure) may be compensated by the control unit 44 considering at least the ambient temperature and pressure values. measured by the respective sensors.

Therefore, said check test allows maintaining/restoring the pressure conditions (Pmin, Pmax) experimentally found (in the laboratory) by adapting the pump performance to the engine feeding conditions set by the manufacturer or by the user (Qmin, Qmax).

Basically, the pump must be able to deliver Qmin with pressure Pmin and Qmax with pressure Pmax regardless of any changes in its performance, ensuring the delivery of the same flow rate value over time at the respective number of engine revolutions.

As an alternative to such operating logic, herein referred to as "update logic" as it provides for a mapping update substantially at each execution of the check test regardless of the detected values, it is possible to consider an operating logic, herein referred to as "comparison logic", based on the comparison of the values of the signals PWM.Pompa (or Rpm.Pompa).

Said comparison logic is substantially based on said updating logic, and differs in that it provides for a comparison between the detected values PWM.Pompa with reference values PWM.Pompa, such as the original values or those stored in the previous check test.

The comparison logic, once the values of PWM.Pompa have been detected and stored, proceeds in the following possible ways:
- if the detected values PWM.Pompa substantially correspond to the reference values of PWM.Pompa, it means that the pump has no efficiency losses and the pump mapping remains unchanged;
- if the values of PWM.Pompa diverge from each other by a certain percentage or by a certain threshold value, defined by the manufacturer or by the user, then the control unit 44 can signal such divergence to the user, through the user interface, and/or proceed by updating the pump mapping taking into account the pump performance detected.

In general, the check test lasts in the order of one second, for example 3÷6 seconds. With respect to such possible check procedures, the calibrated hole 22 introduces a section reduction along the fuel return line, which has the task of creating an upstream pressure increase.

The geometry of said calibrated hole 22, simulating a passage of fuel equal to the flow rate Qmax, determines a pressure increase substantially equal to Pmax along the second feeding duct 19 and the first return duct 20.

During the check test, by increasing the number of revolutions of the pump 17, there is an increase in the fuel flow rate and once the flow rate Qmax is reached, thanks to the calibrated hole 22, the pressure Pmax is reached.

As to the pressure Pmin, it is simulated with the engine off by putting the fuel line under pressure, by the fuel pump 17 and the closing of the solenoid valve 21, until the reference pressure Ptest is detected.

The pressure Ptest may be found experimentally, for example by laboratory tests or software simulations, and is distinguished from Pmin by the fact that Pmin represents the fuel pressure value with the engine running and at idle speed, while Ptest simulates Pmin during the test of the pump with engine off.

As an alternative to the pressure sensor 31, it is possible to use the current sensor 46 and the supply voltage detection means 47 so as to determine the energy consumption of the pump associated with the minimum Pmin and maximum Pmax pressures.

Regardless of the expected and adopted operating logic, the calibration means 22 according to the invention allows monitoring the fuel pump operation and updating the operating conditions of the feeding system to the pump operating conditions by recalibrating at least the pump mapping.

In accordance with a possible embodiment variant, said calibrated hole 22 may be defined by means of a tube made of plastic, for example polyethylene, polypropylene, PVC (polyvinyl chloride) or the like, or ceramic, or metal material, for example stainless steel, aluminium or the like or in general with any material suitable for the purpose.

The dimensions and geometries of the calibrated hole 22 can be theoretically calculated, for example by software design, or empirically determined with laboratory tests.

It has been found, for constructive practicality, that it is preferable to vary the length of the tube to adapt and calibrate the calibrated hole 22 to the capacity of the engine to be equipped.

Once the maximum pressure Pmax has been determined (as described above) and the internal diameter of the calibrated hole 22 has been established, the length of the tube is then adjusted so that its downstream flow rate is equivalent to Qmax.

Alternatively, the solenoid valve 21 could be used to generate a partialization of the fuel flow rate that passes through it; this may be achieved with a series of pulses with variable opening and closing times controlled by the control unit 44 and may replace, only in the control function of the pump 17, the presence of the calibrated hole 22.

In addition, the calibrated hole 22 may advantageously increase the reliability and safety of the feeding system.

In fact, in the event of a failure or malfunction of the solenoid valve 21, the calibrated hole 22 limits the fuel flow rate along the fuel return line.

For example, in the event that the solenoid valve 21 remains open during normal engine operation, perhaps due to impurities created in the feeding circuit, the calibrated hole 22 limits the fuel flow that crosses the return line, ensuring the feeding of the injector 7 and keeping the engine running.

If such problem occurs, the control unit 44 intervenes by enriching the mixture, or by increasing the quantity of fuel with respect to that provided for by the stoichiometric ratio, in order to keep the engine running and informing the user about the malfunction, via the display 35.

Should this accident occur in a return line without said calibrated hole, the fuel circuit would experience a sudden pressure drop, due to the free passage of fuel along the return line (since in such case the return line is capable of evacuating flow rates greater than Qmax), with consequent feeding problems for the engine that may lead to an undesired shutdown of the same.

Such possibility is absolutely to be avoided in the case of paramotors or the like as an undesired shutdown of the engine is a serious risk to the user's safety, while in the case of drones or the like it can cause them to fall to the ground with possible damage.

The calibrated hole 22 allows keeping the engine running, enabling the user to perform the possible descent and landing manoeuvres.

Nothing prevents said calibration means 22 to be installed and used also on feeding systems other than that according to the present invention.

Said calibration means 22, therefore, may be used on any type of fuel feeding line equipped with a return line, in particular it may be used on internal combustion engines that provide a feeding system according to:
- the prior art;
- the invention in its minimal form, i.e. substantially without sensor means or the like;
- the invention equipped with sensor means and capable of determining respective correction factors for the flow rate value Qn;
- any type of feeding suitable for the operation of an internal combustion engine.

In fact, if the calibrated hole were arranged on a feeding system different from that of the present invention, i.e. which does not provide for the simultaneous adjustment of the number of revolutions of the fuel pump and the of energisation time of the injector, there would be still the advantage of increasing the safety of the feeding system by avoiding the undesired shutdown of the engine due to malfunctions or failures of the solenoid valve (as illustrated above) and the possibility of checking the status of the fuel pump and the relative performance thereof.

In accordance with a possible embodiment variant of the electronic fuel injection control system for internal combustion engines according to the present invention, given by way of non-limiting example, said feeding system may provide:
- a modulating fuel pump, preferably of the brushless type, with the possibility of feedback on the number of revolutions and possible integrated electronic drive. Said pump is controlled with a PWM technique and allows precise duty/cycle values to be matched to precise Rpm.Pompa values regardless of the workload;
- a reduced fuel delivery pressure at medium-low engine speeds, compensating for this reduction by longer injection times for any fuel flow rate; this results in greater precision in fuel delivery thanks to a longer injector energisation time than its minimum energisation time; an advantage particularly felt in small displacement engines (drones);
- a maximum injector energisation time allowed substantially at the maximum engine rotation speed; this allows the pump rotation speed and therefore the current consumption to be reduced to a strict minimum;
- mappings, related to the opening degree of the throttle valve and the fuel flow rate to be delivered, capable of determining the delivery of fuel to the cylinder, and correction factors based on the variation of the air pressure and temperature parameters, and/or reference limit temperatures EGT and CHT;
- a return line equipped with calibration means for the diagnostics of the operating parameters of the fuel pump; this allows periodic calibration of the pump pressure values;
- that the mapping change and/or the stoichiometric ratio variation can be adjusted by the user, preferably through the user interface, so as to adapt the engine to different types of propellers, to different fuel performance and/or to engine wear.

The electronic fuel injection control system for internal combustion engine according to the present invention, thanks to the simultaneous regulation of the energisation time of the injectors and the number of revolutions of the fuel pump, allows the consumption of electric current to be greatly reduced and consequently allows a weight reduction of the storage/supply battery.

The reduction in current consumption is due to the fact that the fuel pump, in particular at medium-low engine speeds, works at lower pressures, and therefore revolutions; by keeping low the number of revolutions at which said pump operates, its current consumption is kept low.

From experimental tests it has been found that the current consumption is about ⅕ compared to that of traditional systems; this allows the use of a smaller battery and/or a generator with a small voltage rectifier and battery charger, for the benefit of lightness.

It has also been found that if an extended battery life is reached, there is the possibility of not installing any alternator and any voltage rectifier with battery charger function, with further weight savings and increased reliability.

According to a possible embodiment variant, therefore, it is possible to greatly reduce the electrical components and the relative electrical wiring, for example by not installing the generator, the voltage regulator or similar devices.

In such case, the number of components is advantageously reduced for the benefit of the strength and reliability of the electrical system.

Generally, in fact, the electrical and/or electronic components are subject to malfunctions and/or overheating that may lead to engine shut-off or to the combustion of the same components with serious consequences for the safety of the user.

Additional advantages that are achieved with the electronic fuel injection control system according to the present invention, at least for one or more variants, are:
- the fuel pump operates at lower pressures. The greatest advantages are obtained at medium-low engine speeds;
- longer life of the pump compared to an operating scheme according to the prior art, thanks to the lower operating pressures at medium-low speeds and to lower fuel overheating;
- lower electricity consumption; the advantage of reduced power consumption is greater than the "loss" of efficiency in the atomisation of fuel to the injector resulting from lower pressures at medium-low speeds. In the 2S engine with indirect injection, the combustion air and the fuel perform the mixing thereof along the way from the throttle body to the reed valve, inside the pump casing and through the transfer ports. The latter two ambients being hot and turbulent, thanks to the drive shaft/connecting rod movement, favour the vaporisation of the fuel reducing the need to work with high fuel pressures at medium-low engine speeds;
- the modulation of the pump allows having a feeding system capable of adapting to different displacements, from very small, for example 10 cm$^3$, to very large, for example 1000 cm$^3$, without the need to significantly change the operating logic of the feeding system itself;
- the reduced electrical consumption allows the use of the present invention also in the field of drones or model building or the like;
- the reduction of mechanical stresses, due to lower pressures, with positive effects on components such as injectors, tubes, valves, sensors, and a considerable reduction of vibrations.

Experimental tests have shown that, thanks to such pump/injector double regulation, no particular algorithm is required to manage the acceleration/deceleration steps as the feeding system has extremely fast response times.

In addition, the feeding system is extremely fast and ready for changes of engine speed.

It should be noted, in fact, that the feeding system adapts to the desired flow rate values, by defining the injector energisation time values and number of pump revolutions, while the fuel pressure is continuously varying according to the engine speed and/or the opening degree of the throttle valve.

If a time-injector/Rpm.Pompa double modulation with feedback on the fuel pressure is intended to be carried out, an extremely complex system affected by response delays would be obtained.

It is clear that several variants to the invention described above are possible for the man skilled in the art, without departing from the novelty scopes of the inventive idea, as well as it is clear that in the practical embodiment of the invention the various components described above may be replaced with technically equivalent ones.

For example, according to a possible embodiment variant, the electronic fuel injection control system according to the present invention may provide for devices and measures, by means of software, adapted to increase safety during the starting procedure.

When starting the engine, due to inexperience or inattention of the user, it can remain strongly accelerated with the risk of damages and physical consequences for the same user due to the collision with the accelerating propeller.

This problem is strongly felt when the engine is switched on with the support frame of the paramotor resting on the ground; in this case an inappropriate start attempt may be extremely dangerous and cause serious consequences for the user such as the loss of an arm or even death.

The feeding system proposes to solve this problem by software management of the ignition means during the engine start-up steps.

For this purpose, the feeding system may provide for controlling the number of revolutions of the engine for a certain period of time so as to allow the user to safely perform the ground manoeuvres prior to the flight.

Said limitation, set by the manufacturer and/or by the user, may take into account the minimum and/or maximum engine speed.

For example, assuming an idle speed of 2000 rpm, it is possible to envisage a maximum engine rpm threshold of 3000 rpm for a period of time of a few seconds or a few tens of seconds depending on the needs and type of application.

In order to implement such limitation, the feeding system, in particular the control unit 44, takes into account the opening degree of the throttle valve and the engine rotation speed.

In addition, the feeding system may provide for a dual safety if such maximum revolution threshold is exceeded, for example because the user is opening the accelerator.

Said dual safety, advantageously managed by the control unit 44, provides for the simultaneous interruption of the electrical supply to the spark plug and fuel feed to the injector.

Said double interruption provides greater safety because:
the interruption of the electric current alone may not be sufficient to shut-down the engine due to the presence of residual micro-charges or by self-ignition which may in any case trigger the combustion in the cylinder;
the interruption of the fuel does not guarantee the shut-down as even very small residual quantities of fuel could still trigger the combustion; furthermore, it should be considered the fact that small quantities of fuel tend to accumulate at idle speed so as to make the engine ready.

It can be deduced that said double interruption ensures the shutdown of the engine as the two (electrical and chemical) power sources that ensure the combustion are suspended.

In the event of a rapid release (or closing) of the accelerator by the user and therefore of a sudden decrease in the number of revolutions below the maximum threshold value, the control unit 44 instantly re-enables the spark plug electrical and fuel feed allowing the engine to remain running; this avoids having to proceed with a further start attempt.

For the same reasons set out above, the feeding system, in the case of electric/electronic start, may be equipped with an additional safety.

In this case, the control unit 44 can allow the engine to be started by implementing a specific ignition procedure, in order to avoid accidental start due, for example, to a hand resting on the user interface (or control panel or dashboard) or accidental fall of the control joystick on the ground.

For example, said ignition procedure can provide a quick double click on the start button; the control unit 44 will start the engine only if detects said procedure.

The control unit 44 may also carry out, safely and independently, a check of the double ignition coil.

In fact, for safety reasons, some aircraft engines have a dual spark plug arrangement (Dual-Spark) per cylinder.

After start, the system performs the test of the two coils, turning them off alternately, and providing the user with any malfunctions detected during the check.

Furthermore, the feeding system according to the present invention may determine and display the amount of fuel present in the tank without the use of a fuel level sensor.

For this purpose, the user, through the user interface, sets the amount of fuel inserted in the tank and the control unit 44 constantly updates the amount of residual fuel according to the instantaneous consumption of the engine itself.

Upon reaching a minimum pre-set threshold value, the control unit 44 alerts the user via a light indicator with FLA ("Fuel Level Alarm") function to indicate a state of low fuel quantity on board.

In addition, the control unit 44 can carry out sensor tests both before and during the flight and will evaluate, following the user's consent, if the sensor in a malfunctioning state is necessary to safely undertake the flight.

The same alarms take on a different meaning depending on whether in flight or on the ground; for example, a low battery level may prevent from flying if displayed on the ground, while it does not cause any engine shutdown if in flight, even if the warning shown on the display remains active.

The temperature sensor malfunction alarm will still allow flying or keep flying; however the engine will operate without protection against the excessive temperature of the EGT and/or CHT exhaust gases.

The invention claimed is:

1. Internal combustion engine comprising an electronic fuel injection control system for an internal combustion engine, said internal combustion engine being equipped with at least one fuel feeding line provided with a fuel tank, at least one throttle valve capable of regulating the air flow, at least one injector, at least one fuel pump, at least one fuel return line comprising at least one solenoid valve, at least one first fuel return duct that connects said injector to said solenoid valve, at least one overpressure valve, at least one second return conduit adapted to connect said overpressure valve and said solenoid valve with said tank,
wherein said fuel return line is provided with at least one calibration means, where said calibration means:
is sized and designed so as to simulate a specific fuel consumption of the said engine;
comprises narrowings or section shrinkages, holes;
allows at least verifying the state of said fuel pump and the related performance
thereof;
wherein said calibration means has geometries capable of simulating, with said solenoid valve substantially totally open, the consumption of the said engine at maximum speed, i.e., the fuel maximum operating flow rate (Qmax) required by said engine at maximum speed; and
wherein said system comprises at least one fuel pressure sensor means and at least one control unit provided with at least one microcontroller, memory means and at least one processing and/or control software, where said system, by means of said calibration means and said control unit, performs a check test adapted to identify and define the values of the number of revolutions of said fuel pump necessary to obtain the fuel minimum (Pmin) and maximum (Pmax) pressure values, respectively, i.e. the pressure values capable of delivering the fuel minimum operating flow rate (Qmin) and the fuel maximum operating flow rate (Qmax) so as to meet the operating limit conditions of the said engine.

2. Internal combustion engine according to claim 1, wherein said calibration means (22) is placed downstream of said solenoid valve.

3. Internal combustion engine according to claim 1, wherein said system comprises at least one detection sensor means for the opening degree ($\theta_{valv}$) or the position of said throttle valve, and said control unit is adapted to simultaneously modulate both the number of revolutions of said fuel pump, in order to vary the pressure of said fuel feeding line, and the energisation time of said injector according to the fuel quantity (Qn) to be delivered for that certain opening degree or position of said throttle valve.

4. Internal combustion engine according to claim 3, wherein said control unit comprises one or more mappings for said simultaneous modulation of the number of revolutions of said fuel pump and of the energisation time of said injector, where said one or more mappings comprise at least one:
"fuel throttle valve opening—flow rate mapping", allows a specific opening degree ($\theta_{valv}$) of said throttle valve to be correlated to a certain fuel flow rate value (Qn);
"injector mapping", allows determining, for a specific fuel flow rate value (Qn), a specific energisation time ($t_n$) of the said injector;
"pump mapping", allows a specific fuel flow rate value (Qn) to be correlated with a specific value of the number of revolutions of said fuel pump.

5. Method for checking the performance and state of the fuel pump implemented by the internal combustion engine according to claim 1, where said electronic fuel injection system, through the use of said calibration means, performs a check test adapted to identify and define the values of the number of revolutions of said fuel pump necessary to obtain the fuel minimum (Pmin) and maximum (Pmax) pressure values, respectively, said check test providing for at least the following steps:

close and keep said injector closed;

open said solenoid valve and perform the bleeding of said fuel feeding line;

once said bleeding is ended, proceed with a gradual increase in the number of revolutions of said fuel pump until the maximum pressure value (Pmax) of the fuel established for that engine is detected by said pressure sensor means;

store the signal value (PWM.Pompa.max) of said fuel pump corresponding to the rotation speed of said pump capable of reaching said maximum pressure (Pmax);

close said solenoid valve and reduce the number of revolutions of said fuel pump until the pressure reference value (Ptest) of the fuel established for that engine is detected by means of said pressure sensor, said pressure reference value (Ptest) of the fuel being capable of simulating the fuel minimum pressure value (Pmin);

store the signal value (PWM.Pompa.min) of said fuel pump corresponding to the rotation speed of said pump capable of reaching and ensuring, in engine-running conditions, the delivery of the fuel minimum operating flow rate (Qmin) at minimum pressure (Pmin).

6. Method, according to claim 5, wherein said two signals values (PWM.Pompa.min; PWM.Pompa.max) of said fuel pump are used by said control unit to update at least said pump mapping.

7. Method, according to claim 5, wherein said check test may be programmed at every start of said engine, or at predetermined time periods or after a certain number of hours of engine operation or upon request by the user.

* * * * *